United States Patent

Firester

[11] 4,011,524
[45] Mar. 8, 1977

[54] OPTICAL ELEMENT FOR A LASER
[75] Inventor: Arthur Herbert Firester, Skillman, N.J.
[73] Assignee: RCA Corporation, New York, N.Y.
[22] Filed: Nov. 14, 1975
[21] Appl. No.: 632,061

Related U.S. Application Data
[63] Continuation-in-part of Ser. No. 490,401, July 22, 1974, abandoned.

[52] U.S. Cl. .................. 331/94.5 C; 331/94.5 D
[51] Int. Cl.² ................................. H01S 3/08
[58] Field of Search .......................... 331/94.5

[56] References Cited
UNITED STATES PATENTS
3,528,028   9/1970   Baird .......................... 331/94.5
3,566,302   2/1971   Rhodes ...................... 331/94.5 D Primary Examiner—William L. Sikes
Attorney, Agent, or Firm—Glenn H. Bruestle; George H. Haas

[57] ABSTRACT

An optical element for a laser, such as a mirror, includes a rectangular parallelepiped body of a material suitable for the element, such as glass, and a cylindrical projection extending from one surface of the body. The projection is smaller in area than the area of the surface of the body and the periphery of the projection is spaced from the edges of the surface. The edge of the surface of the projection is free of nicks or chips and serves as the mounting edge for the element in a laser. A plurality of the elements are made simultaneously by etching the surface of a sheet of material to form a plurality of spaced projections and dividing the sheet along lines between the projections. Prior to dividing the sheet, the surfaces of the projections may be coated with a suitable optical coating.

3 Claims, 8 Drawing Figures

OPTICAL ELEMENT FOR A LASER

This is a continuation-in-part of Application Ser. No. 490,401 filed on July 22, 1974 entitled OPTICAL ELEMENT FOR LASER and now abandoned.

BACKGROUND OF THE INVENTION

The present invention relates to an optical element for a laser, such as a mirror, Brewster window, or the like, and particularly to such an optical element which can be made easily and inexpensively with a clean, chip free mounting edge.

Most lasers have various optical elements, such as mirrors, Brewster windows, prism reflectors and the like, mounted at the ends of the bore tube of the laser. One method of mounting such an optical element, e.g., a mirror, at the end of the bore tube is to form a spherical cavity in the end surface of the bore tube and secure the mirror, which is cylindrical in shape, in the cavity with a suitable bonding material, such as a plastic, such as described in U.S. Pat. No. 3,739,297. This type of mounting provides for ease of adjusting the angle of the mirror with respect to the longitudinal axis of the bore tube. Typically, to mount the mirror in the cavity, the edge of an end surface of the cylindrical mirror is placed in line contact with the surface of the cavity and the mirror is held to the end of the tube by a vacuum on the tube. The mirror is then tilted to the desired angle and the bonding material is applied around the mirror. In order to firmly hold the mirror to the end of the tube while the position of the mirror is being adjusted and to prevent any of the plastic bonding material from being drawn into the tube, there must be no openings between the edge of the mirror and the surface of the cavity. Thus, the mirror must be perfectly cylindrical to provide a perfectly circular edge and the edge must be free of chips or nicks.

The mirrors are generally made by forming individual, small cylinders of high quality optical glass, individually polishing the cylinders and individually applying the desired optical coatings on the mirror surface. To handle each of the mirrors, which are as small as 0.187 inch, individually is difficult and time consuming. Also, to process the mirrors so as to achieve a completely circular, chip free edge is expensive. Furthermore, because of the manner that the individual mirrors are supported when an optical coating is applied to them, the optical coating is not of uniform thickness at the edge of the mirror so that only the center portion of the mirror can be used. Thus, such mirrors as well as other types of optical devices used for lasers are relatively expensive.

SUMMARY OF THE INVENTION

An optical element includes a body of a material suitable for the element. The body has a surface and a projection extending from the surface. The projection has a surface which is smaller in area than the surface of the body and is spaced from the edge of the body surface. The edge of the surface of the projection is substantially free of chips. The optical element may be made by etching a surface of a flat sheet of a material suitable for the optical element so as to form a plurality of spaced projections, each of which has a circular surface. The sheet is divided along lines extending between and spaced from the projections to separate the individual elements. The optical element is in line contact with a concave surface on the end of a laser tube.

DETAILED DESCRIPTION

Figure 1:
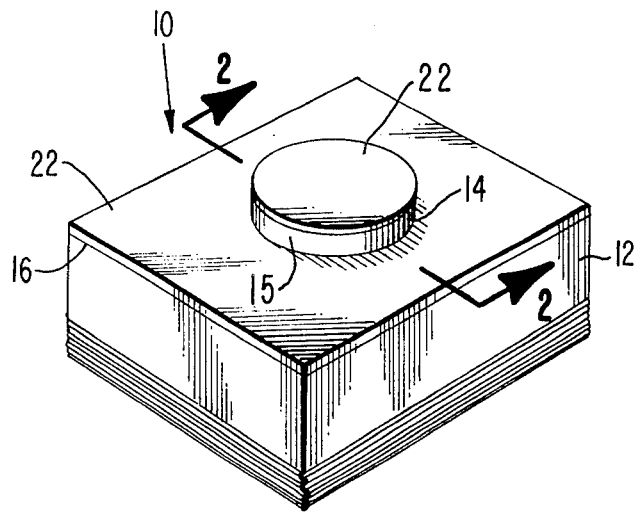
FIG. 1 is a perspective view of a laser mirror of the present invention.
Figure 2:
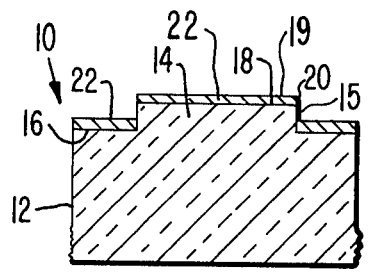
FIG. 2 is a sectional view taken along line 2—2 of FIG. 1.

Referring to FIGS. 1 and 2, one form of an optical element, a laser mirror, of the present invention is generally designated as 10. The laser mirror 10 is preferably of glass, and comprises a rectangular parallelepiped body 12 having a cylindrical projection 14 extending from a flat surface 16 thereof. The projection 14 has a cylindrical side surface 15 and a circular flat surface 18. The flat surface 18 of the projection 14 is smaller in area than the parallelepiped surface 16, and the cylindrical side surface 15 is spaced from the edges of the parallelepiped surface 16. Preferably, the projection 14 is centrally positioned on the surface 16. A coating 22 of a reflective material is disposed on the flat surfaces 16 and 18 forming a top surface 19 on the projection 14. The reflective coating 22 may be of any well-known reflective material or multiple layers of various optical materials, such as thorium fluoride, zinc sulfide, titanium dioxide, silicon dioxide and the like. The intersection of the cylindrical surface 15 and the top surface 19 of the coating 22 forms an annular edge 20. The edge 20 is the mounting edge of the mirror 10 and should be free of any chips or nicks.

Figure 3:
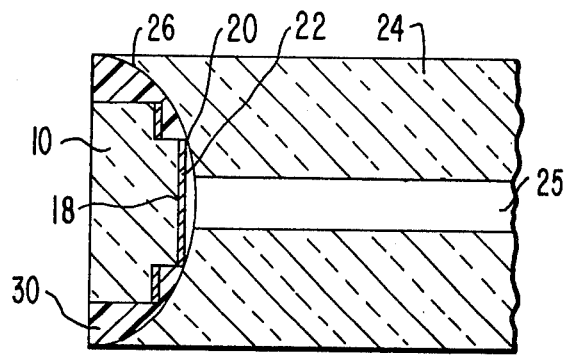
FIG. 3 is a sectional view showing the laser mirror mounted on the end of a laser tube.

FIG. 3 shows the laser mirror 10 mounted on the end of a laser bore tube 24. The laser bore tube 24 has a longitudinal bore 25 therein and a concave spherical cavity 26 in its end surface. The laser mirror 10 is seated in the cavity 26 with the annular mounting edge 20 of the cylindrical projection 14 seated against the spherical surface of the cavity 26. The flat surface 18 of the projection 14 extends across the opening formed in the central portion of the concave surface of the cavity 26 by the end of the bore 25 of the bore tube 24. The laser mirror 10 is in line contact along the edge 20 with the surface of the cavity 26. There is no surface to surface contact between the laser mirror 10 and the bore tube 24. The laser mirror 10 is secured in the cavity 26 by a bonding material 30, such as a plastic. The line contact between the mirror 10 and the bore tube 24 prevents the bonding material 30 from leaking into the bore 25. Although the body 12 projects beyond the periphery of the projection 14, the spherical shape of the cavity 26 permits the mirror 10 to fit within the cavity.

Figure 4:
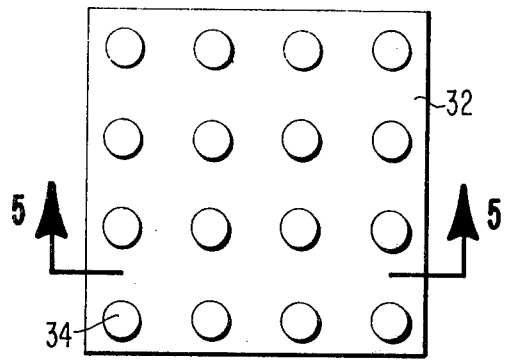
FIG. 4 is a top plan view showing the first step of the method of the present invention.
Figure 5:
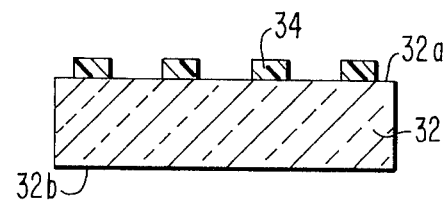
FIG. 5 is a sectional view taken along line 5—5 of FIG. 4.

To make the laser mirror 10, one starts with a flat sheet of glass 32 (see FIGS. 4 and 5) of a thickness equal to the combined thickness of the parallelepiped body 12 and projection 14. A plurality of spaced, circular areas 34 of a suitable resist material are provided on one flat surface 32a of the glass sheet 32. The resist areas 34 may be a wax, resistant paints or coatings, or any of the well-known photosensitized organic resists. Each circular area 34 is of a diameter substantially equal to the diameter of the cylindrical projection 14. The resist areas 34 may be applied by either coating through a suitable mask or by coating the entire surface 32a with a photosensitive resist material and forming the circular areas 34 by standard photolithographic techniques. The circular areas 34 are preferably arranged in uniformly, spaced rows and columns, as shown in FIG. 4.

Figure 6:
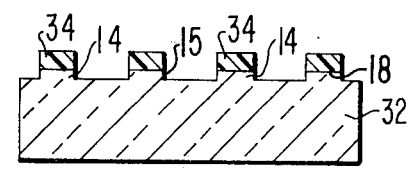
FIG. 6 is a sectional view similar to FIG. 5 showing the next step of the method of the present invention.

The exposed surface 32a of the glass sheet 32 is then etched with a suitable etchant, such as hydrofluoric acid solution, to form a plurality of cylindrical projections 14 on the glass sheet 32 as shown in FIG. 6. Preferably the glass sheet 32 is etched to provide projections 14 which are of a height of about 0.001 inch to 0.002 inch.

Figure 7:
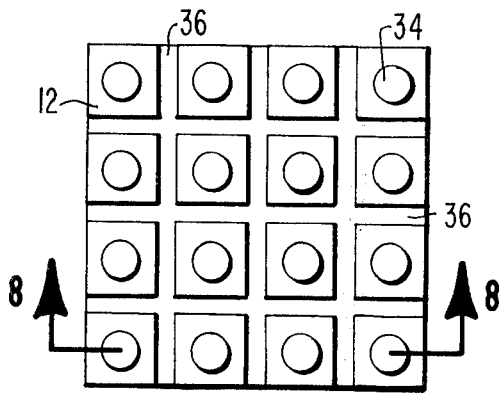
FIG. 7 is a top plan view showing the next step of the method of the present invention.
Figure 8:
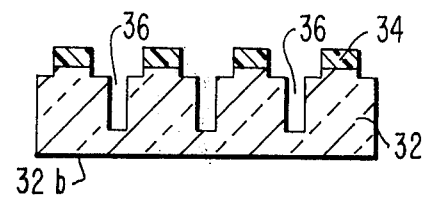
FIG. 8 is a sectional view taken along line 8—8 of FIG. 7.

The glass sheet 32 is then cut along lines extending between the rows and columns of the projections 14 from the etched surface of the sheet 32 to a point slightly spaced from the unetched surface 32b of the sheet 32 as shown in FIGS. 7 and 8. This forms a plurality of rectangular parallelepiped bodies 12 separated by the cuts 36 but connected together by a thin portion of the glass sheet 32 along the surface 32b of the glass sheet at the bottoms of the cuts 36. The cuts 36 may be formed by any suitable glass cutting means, such as a diamond wheel. The circular resist areas 34 are then removed with a suitable solvent. The reflective coating 22 can then be applied to the projections 14 using any well-known coating technique. The sheet 32 can then be broken along the bottoms of the cuts 36 to divide the sheet into individual mirrors 10. The glass sheet 32 can be broken either by cracking along the thin interconnecting portion of the glass sheet or by scribing along the unetched surface 32b and cracking along the scribe lines.

In this method, the shape of the projections 14 is defined by the resist areas 34. The shape of the resist areas 34 can be easily and accurately defined using either the mask coating technique or the photolithographic technique so that the circular shape of the projections 14 are easily and accurately achieved. The mounting edge 20 of the projection 14 is defined by the etching of the glass sheet 32. This etching operation forms a sharp edge which is clean and free of any chips or nicks. When the glass sheet 32 is divided to separate the individual mirrors 10, the dividing lines are spaced from the mounting edge 20 so that the dividing operation cannot cause any chipping of the mounting edge 20. In addition, during the cutting of the glass sheet 32, the resist areas 34 protect the surfaces 18 of the projections 14 from any dust or other contaminants created during the cutting operation. Thus, when the resist areas 34 are removed, the flat surfaces 18 of the projection 14 are clean and ready to be coated with the reflective coating 22.

It has been found that standard window glass has surfaces which are sufficiently smooth for use as a laser mirror. Since the flat surfaces 18 of the projection 14 are protected by the resist areas 34 during the etching and cutting operations, polishing of this surface is not required before applying the reflective coating 22.

In addition, this method simultaneously fabricates a plurality of the laser mirrors eliminating the need for individual handling of small mirrors. Thus, the method permits the inexpensive manufacture of small laser mirrors having good optical properties and mounting edges which are accurately circular and free of chips or nicks.

Also, instead of forming the projections 14 by etching the sheet, the projections can be formed by sandblasting the sheet with the resist areas 34 protecting the surfaces 18 of the projections. The projections 14 instead of being circular can be of any shape to provide a mounting edge 20 which will fit the shape of the surface against which it is mounted. In addition, instead of providing the cuts 36 in the etched or abraided surface of the sheet, the cuts can be provided in the other surface of the sheet.

What is claimed is:

1. A laser device comprising a tube having on an outer surface thereof a cavity with a concave surface, an opening into the tube through a central portion of the concave surface, a glass block secured to said tube and extending within said cavity and across said central concave surface portion, a part of said glass block formed as a projection extending toward said opening, said projection having an annular edge seated in line contact against the concave surface of said cavity and extending around said opening, said projection including an optical reflector enclosed within said annular edge and extending across said opening.

2. A laser device in accordance with claim 1 wherein said tube includes a longitudinal bore extending therethrough and terminating at said opening.

3. A laser device in accordance with claim 2 wherein said cavity comprises a spherical concave surface, said projection being cylindrical with a circular end extending toward said opening, said optical reflector comprising a mirror formed on the circular end of said projection.

* * * * *